United States Patent
Elman et al.

(10) Patent No.: US 6,964,795 B2
(45) Date of Patent: *Nov. 15, 2005

(54) MULTILAYER OPTICAL COMPENSATOR, LIQUID CRYSTAL DISPLAY, AND PROCESS

(75) Inventors: James F. Elman, Fairport, NY (US); Tomohiro Ishikawa, Rochester, NY (US); Paul D. Yacobucci, Rochester, NY (US); Dennis J. Massa, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 10/431,742

(22) Filed: May 8, 2003

(65) Prior Publication Data

US 2004/0027520 A1 Feb. 12, 2004

Related U.S. Application Data

(63) Continuation-in-part of application No. 10/211,401, filed on Aug. 2, 2002, now abandoned.

(51) Int. Cl.$^7$ .......................................... G02F 1/13363
(52) U.S. Cl. .................. 428/1.3; 349/117; 349/118; 349/119; 349/120; 349/121
(58) Field of Search ................. 428/1.3–1.33; 349/117–121

(56) References Cited

U.S. PATENT DOCUMENTS

| 3,849,144 | A | * | 11/1974 | Wadsworth et al. | ..... 430/270.1 |
|---|---|---|---|---|---|
| 5,344,916 | A | * | 9/1994 | Harris et al. | ................. 528/353 |
| 5,750,641 | A | * | 5/1998 | Ezzell et al. | ................. 528/353 |
| 6,512,561 | B1 | * | 1/2003 | Terashita et al. | ............ 349/118 |
| 6,590,707 | B1 | * | 7/2003 | Weber | ......................... 359/498 |
| 6,628,359 | B1 | * | 9/2003 | Terashita et al. | ............ 349/120 |
| 6,853,424 | B2 | * | 2/2005 | Elman et al. | ................ 349/117 |
| 2001/0026338 | A1 | | 10/2001 | Aminaka | |
| 2003/0219549 | A1 | | 11/2003 | Shimizu | ..................... 428/1.1 |

FOREIGN PATENT DOCUMENTS

| EP | 0 911 656 | 4/1999 |
|---|---|---|
| JP | 2000-275434 | 10/2000 |
| JP | 01194668 | 7/2001 |
| JP | 2003-226763 | 8/2003 |
| JP | 2003-231143 | 8/2003 |

OTHER PUBLICATIONS

J. F. Elman, "Liquid Crystal Cell with Compensator Layer and Process", U.S. Appl. No. 10/, D–84089) filed Aug. 2, 2002.

* cited by examiner

*Primary Examiner*—Harold Pyon
*Assistant Examiner*—Sow-Fun Hon
(74) *Attorney, Agent, or Firm*—Arthur E. Kluegel (57) ABSTRACT

Disclosed is an optical compensator for liquid crystal displays comprising a first polymeric layer having an out-of-plane birefringence not more negative than –0.005 and a second polymeric layer having an out-of-plane birefringence more negative than –0.005. The invention also provides an LC display and a process for making such compensators.

51 Claims, 3 Drawing Sheets

MULTILAYER OPTICAL COMPENSATOR, LIQUID CRYSTAL DISPLAY, AND PROCESS

CROSS-REFERENCE TO RELATED APPLICATION

This application is a continuation-in-part of U.S. Ser. No. 10/211,401 filed Aug. 2, 2002, now abandoned the contents of which are incorporated herein by reference.

FIELD OF THE INVENTION

The present invention relates to a multilayer optical compensator for liquid crystal displays comprising first and second layers exhibiting particular birefringent properties. The invention also provides a LC display and a process for making such a compensator.

BACKGROUND OF THE INVENTION

Triacetylcellulose (TAC, also called cellulose triacetate) film has traditionally been used by the photographic industry due to its unique physical properties, and flame retardance. TAC film is also the preferred polymer film for use as a cover sheet for the polarizers used in liquid crystal displays. It is the preferred material for this use because of its extremely low in-plane birefringence. Its out of plane birefringence is also small (but not zero), and is useful in providing some optical compensation to the LCD.

Intrinsic birefringence describes the fundamental orientation of a material at a molecular level. It is directly related to the molecular structure (bond angles, rotational freedom, presence of aromatic groups, etc.) of the material. The intrinsic birefringence is not affected by process conditions (temperature, stresses, pressures) used to make a macroscopic object.

Crystalline and liquid crystalline materials have the convenient property that their intrinsic birefringence manifests itself almost perfectly when they are assembled into a macroscopic article. Layers of crystalline and liquid crystalline molecules often can be manufactured such that all the molecules in the article are in registry with each other and thus preserve their fundamental orientation. The same is not true when making layers of an amorphous polymeric material. Their intrinsic birefringence can be highly modified by the manufacturing process. Thus, the measured birefringence of an actual article will be a resultant of its intrinsic birefringence and the manufacturing process. Because we are dealing with such amorphous polymeric materials, the following definitions refer to this measured birefringence and not intrinsic birefringence.

In-plane birefringence means the difference between $n_x$ and $N_y$, where x and y lie in the plane of the layer. $n_x$ will be defined as being parallel to the casting direction of the polymer, and $n_y$ being perpendicular to the casting direction of the polymer film. The sign convention used will be $n_x-n_y$.

Out of-plane birefringence means the difference between $n_z$ and the average of $n_x$ and $n_y$, where x and y lie in the plane of the layer and z lies in the plane normal to the layer. The sign convention used will be: $n_z-[(n_x+n_y)/2]$. TAC typically has a negative out of plane birefringence as its $n_z$ is smaller than its $n_x$ and $n_y$.

In-plane retardation (Re) means the product of in-plane birefringence and layer thickness (t). Thus $Re=t(n_x-n_y)$ Out-of-plane retardation (Rth) means the product of out-of-plane birefringence and layer thickness (t). Thus $Rth=t(n_z-[(n_x+n_y)/2])$.

Synthetic polymer films (such as polycarbonate or polysulfone) are often used to enhance the minimal optical compensation that TAC provides. These synthetic polymers films are attached to the rest of the display by adhesive lamination.

Generally in the field of optical materials, the synthetic polymer film is used as an optically anisotropic film (having a high retardation value), while a TAC film is used as an optical isotropic film (having a low retardation value).

European Patent Application No. 0911656 A2 and Japanese Patent Publication 2000/275434 A both disclose a TAC film having high retardation. The TAC is used as a support for an optical compensator sheet, which comprises the TAC support and an optically anisotropic layer containing a discotic liquid crystal molecule. The TAC film achieves high retardation by three methods (including the combination of these three methods): 1) the addition of special aromatic small molecules (i.e. triphenylene) to the TAC film, 2) cooling of the TAC solution before casting the film, and 3) stretching the TAC film. The addition of special aromatic molecules is discussed as being problematic as it can lead to "bleeding" of these molecules out of the TAC film. Also in the examples of this invention very long times (over an hour) are required to dry such TAC films. Such times would not be amenable to a roll to roll process.

In addition to the TAC film, the highly anisotropic, discotic liquid crystal layer requires a special alignment technique and ultra violet radiation to crosslink this monomeric layer.

U.S. Published Patent Application 2001/0026338 A1 discloses a single TAC film with high retardation without the highly anisotropic discotic layer. This TAC film achieves high retardation by the incorporation of molecules with two or more aromatic groups into the TAC film followed by stretching of the TAC film. Without such stretching, this TAC film does not demonstrate any enhanced retardation compared to regular TAC. With this stretching both in and out of plane retardation are increased. These two orthogonal retardations cannot be independently controlled by this method.

Japanese Published Patent Application JP 1999-95208 describes a liquid crystal display having an optical compensator (having high retardation) prepared by uniaxial stretching of a high polymer film. Such polymers include polyesters, polycarbonate, or polysulfone. This stretching step is essential to obtain the desired optical properties. This stretching affects both in- and out-of-plane retardation simultaneously. These two orthogonal retardations cannot be independently controlled by this method. Also, producing uniform optical compensators by this method is described as being difficult.

This application also describes a compensator where the inventor uses an exfoliated inorganic clay material in a polymeric binder coated on top of a TAC support. The exfoliated inorganic clay material in this layer is the optically active material, not the polymeric binder.

Japanese Published Application JP2001-194668 describes a compensator made by laminating polycarbonate films that have been stretched. Not only does the approach require lamination (with its associated difficulties), but it also requires two independent stretchings of two different types of polycarbonate. The lamination step also requires that the two films be in registry with each other and that their optical axes be orthogonal to each other.

It is a problem to be solved to provide a multilayer optical compensator that is readily manufactured and that provides the required degree of in-plane and out-of-plane compensation.

SUMMARY OF THE INVENTION

The invention provides a multilayer compensator for an LC cell comprising one or more first layers having an out-of-plane birefringence not more negative than −0.005 and one or more second layers having an out-of-plane birefringence more negative than −0.005, wherein the layers are amorphous and comprise selected polymeric materials having sufficient thickness so that the overall in-plane retardation (Re) of the compensator is from +20 to −20 nm and the out-of-plane retardation (Rth) of at least one of the one or more second layers is more negative than −20 nm. The invention also provides a liquid crystal display and a process for preparing a compensator of the invention.

The invention multilayer optical compensator is readily manufactured and provides the required degree of in-plane and out-of-plane compensation.

DETAILED DESCRIPTION OF THE INVENTION

The invention is summarized above.

The present invention provides a multilayer compensator for liquid crystal displays comprising a first layer containing a first birefringent material having little or no out-of-plane birefringence and a second layer, typically contiguous to the first layer, containing a second birefringent material having high negative birefringence.

The first layer can comprise an amorphous polymer other than one containing a chromophore group in the backbone and having a Tg less than 180° C. as specified for layer two. A chromophore is defined as an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. heteroaromatic or carbocylic aromatic such as phenyl, naphthyl, biphenyl, thiophene, bisphenol), sulfone, and azo or combinations of these chromophores. A non-visible chromophore is one that has an absorption maximum outside the range of 400–700 nm.

Amorphous polymeric materials are used for this optical compensator. In this case amorphous means that the optical compensator would not produce any sharp diffraction peaks when exposed to X-ray diffraction analysis. Crystalline polymers, liquid crystal molecules and crystalline inorganic materials would produce such sharp peaks when subjected to such X-ray diffraction analysis. Such amorphous materials are desirably suitable to be solvent cast or coated such as TAC, polycarbonates, cyclic polyolefins, polyesters, and polyimides.

Typical lamination uses pressure sensitive adhesive layers of greater than 4 micrometers in thickness. As used herein, the term contiguous means without the use of any intervening laminating adhesive layer and therefore contemplates the possible use of only a very thin (0.2 μm or less) adhesion promoting layer or an adhesion promoting surface treatment such as corona discharge, plasma glow discharge, or flame treatment. Other adhesion enhancing methods could be employed as known to those skilled in the art.

The manufacture of TAC films is well known and includes the following process. A TAC solution (dope) can be prepared according to the following conventional method. In the conventional method, the procedures are conducted at a temperature of not less than 0° C. (room temperature or high temperature). The solution can be prepared by a known dope preparation process with an apparatus used in a normal solvent casting method. As the solvent, a halogenated hydrocarbon (particularly, methylene chloride) is typically used in this method. The amount of TAC is so adjusted that the content of cellulose acetate in a prepared solution is in the range of 10 to 40 wt. %, typically in the range of 10 to 30 wt. %. Additives (described below) can be added to the organic (main) solvent.

The dope is cast on a drum or a band, and the solvent is evaporated to form a film. Before casting the dope, the concentration of the dope is typically so adjusted that the solid content of the dope is in the range of 18 to 35 wt. %. The surface of the drum or band is typically polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include o-acetyltriethyl citrate (OACTE) and o-acetyltributyl citrate (OACTB).

Examples of the other carboxylic esters include butyl oleate, methylacetylricinoleate, dibutyl sebacate and various trimellitic esters. The plasticizers of phthalic esters (DMP, DEP, DBP, DOP, DPP, DEHP) are preferred, and DEP and DPP are particularly preferred. The amount of the plasticizer is in the range of typically 0.1 to 25 wt. %, conveniently 1 to 20 wt. %, desirably 3 to 15 wt. % based on the amount of cellulose acetate.

Stabilizers (e.g., oxidation inhibitor, peroxide decomposer, radical inhibitor, metal inactivating agent, oxygen scavenger, amine) can be also incorporated into the cellulose acetate film. The stabilizers are described in Japanese Patent Provisional Publication Nos. 3(1991)-199201, 5(1993)-1907073, 5(1993)-194789, 5(1993)-271471 and 6(1994)-107854. The amount of the deterioration inhibitor is in the range of 0.01 to 1 wt. %, typically 0.01 to 0.2 wt. % based on the amount of the solution (dope). If the amount is less than 0.01 wt. %, the deterioration inhibitor hardly gives the effect. On the other hand, if the amount is more than 1 wt. %, the deterioration inhibitor often bleeds out onto the film surface. Examples of particularly preferred deterioration inhibitors include butyrated hydroxytoluene (BHT) and tribenzylamine (TBA).

The thickness of the TAC film is less than 140 nm, typically in the range of 70 to 115 $\mu$m, and desirably 70 to 100 $\mu$m.

In the case that the cellulose acetate film is used as a transparent protective film of polarizing plate, the film surface is typically subjected to a surface treatment. Examples of the surface treatments include a corona discharge treatment, a glow discharge treatment, a flame treatment, an acid treatment, an alkali treatment and an ultraviolet ray irradiating treatment. The acid treatment or the alkali treatment is preferred. The acid treatment or the alkali treatment can function as a saponification treatment to the cellulose acetate film.

The alkali treatment is particularly preferred. The alkali treatment uses an aqueous alkali solution. The alkali typically is hydroxide of an alkali metal, such as sodium hydroxide or potassium hydroxide. The aqueous alkali solution has a pH value of typically higher than 10. At least one surface of the cellulose acetate film is immersed in the aqueous alkali solution typically for 1 to 300 seconds, desirably for 5 to 240 seconds. The alkali treatment is conducted typically at 25 to 70° C., and desirably at 35 to 60° C. After the alkali treatment, the cellulose acetate film is typically washed with water.

The second layer will typically be solvent coated onto the first layer. This solvent coating could be accomplished by spin coating, hopper coating, gravure coating, wire bar coating or other coating methods known to those skilled in the art.

The second layer is coated from a solution containing a polymer that yields high negative birefringence upon solvent coating. To produce negative out-of-plane birefringence (negative retardation), polymers that contain non-visible chromophore groups such as vinyl, carbonyl, amide, imide, ester, carbonate, sulfone, azo, and aromatic heterocyclic and carbocyclic groups (e.g., phenyl, naphthyl, biphenyl, bisphenol A, thiophene) in the polymer backbone will be used, such as polyesters, polycarbonates, polyimides, polyetherimides, and polythiophenes.

Examples of suitable polymers for use in the second layer are 1)poly(4,4'-hexafluoroisopropylidene-bisphenol) terephthalate-co-isophthalate, 2)poly(4,4'-hexahydro-4,7-methanoindan-5-ylidene bisphenol)terephthalate, 3) poly(4,4'-isopropylidene-2,2'6,6'-tetrachlorobisphenol) terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, and 6) poly(4,4'-isopropylidene-bisphenol-co-4,4'-(2-norbornylidene) bisphenol)terephthalate-co-isophthalate or copolymers of any of the foregoing.

Desirably, polymers to be used in the second layer will not have chromophores off of the backbone. An example of such an undesirable polymer with chromophores in and off the backbone would be polyarylates possessing significant proportions of the fluorene group.

The glass transition temperature (Tg) of the polymers used in the second layer is significant. Tg values above 180° C. are desirable to achieve preferred results.

The polymers used in the second layer could be synthesized by a variety of techniques: condensation, addition, anionic, cationic or other common methods of synthesis could be employed.

The "second layer" is conveniently one layer but may be comprised of two or more layers. The polymers used in the second layer(s) could be synthesized by a variety of techniques: condensation, addition, anionic, cationic or other common methods of synthesis could be employed.

The combined thickness of the second desirably contiguous layer or layers is typically less than 3 $\mu$m. Typically it is from 0.1 $\mu$m to 20 $\mu$m. Conveniently it is from 1.0 $\mu$m to 10 $\mu$m and more desirably from 2 $\mu$m to 8 $\mu$m.

The second layer is suitably of sufficient thickness so that the out-of-plane retardation of the second layer is more negative than −20 nm. Typically it is from −600 to −60 nm. Conveniently it is from −500 to −100 nm and desirably from −400 to −150 nm.

The invention is described in more detail by referring to the drawings as follows.

Figure 1:
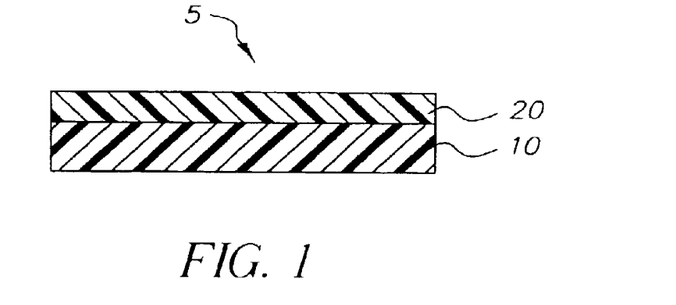
FIG. 1 is a cross-sectional view of two-layer embodiment of the invention

FIG. 1 shows a cross-sectional schematic of a multilayer compensator 5 in accordance with the present invention. The compensator includes a first polymeric layer 10 having low birefringence and a second contiguous polymeric layer 20 having high birefringence and the combined in-plane retardation (Re) of layers 10 and 20 is from +20 to −20 nm and the out-of-plane retardation (Rth) of layer 20 is more negative than −20 nm.

Figure 2:
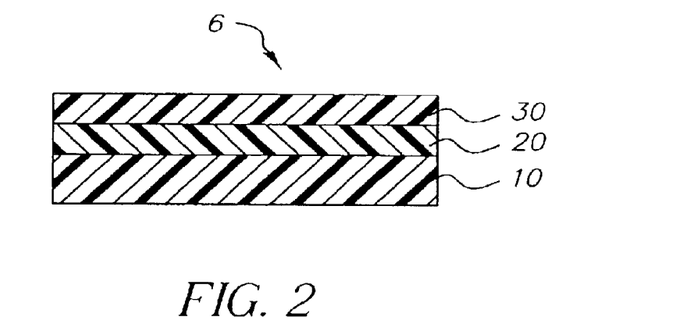
FIG. 2 is a cross-sectional view of three-layer embodiment of the invention

FIG. 2 shows a cross-sectional schematic of another multilayer compensator 6 in accordance with the present invention. The compensator includes a first polymeric layer 10 having low birefringence, a second polymeric layer 20 having high birefringence, and a third polymeric layer 30 having low birefringence, wherein layer 20 is contiguous to layers 10 and 30, and the combined in-plane retardation (Re) of the layers 10, 20 and 30 is from +20 to −20 nm and the out-of-plane retardation (Rth) of layer 20 is more negative than −20 nm. The composition of layers 10 and 30 may or may not be the same.

Figure 3:
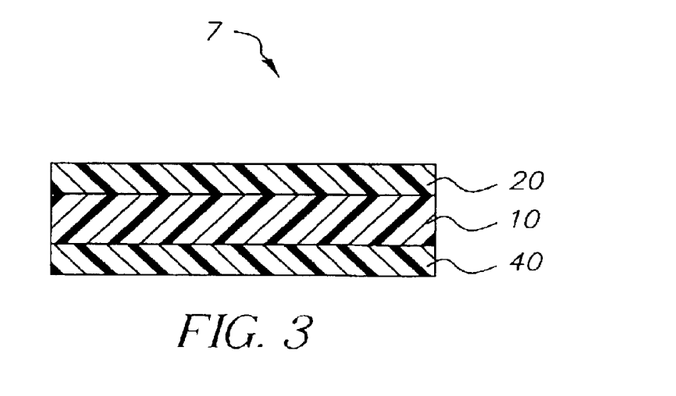
FIG. 3 is a cross-sectional view of another three-layer embodiment of the invention

FIG. 3 shows a cross-sectional schematic of another multilayer compensator 7 in accordance with the present invention. The compensator includes a first polymeric layer 10 having low birefringence, a second polymeric layer 20 having high birefringence, and a third polymeric layer 40 having high birefringence, wherein layer 10 is contiguous to layers 20 and 40, and the combined in-plane retardation (Re) of the layers 10, 20 and 40 is from +20 to −20 nm and the combined out-of-plane retardation (Rth) of layers 20 and 40 is more negative than −20 nm. The composition of layers 20 and 40 may or may not be the same. Conveniently, layers 20 and 40 have the same composition and thickness in order to provide a symmetrical multilayer compensator having curl control. One skilled in the art could conceive of more complex structures.

Figure 4A:
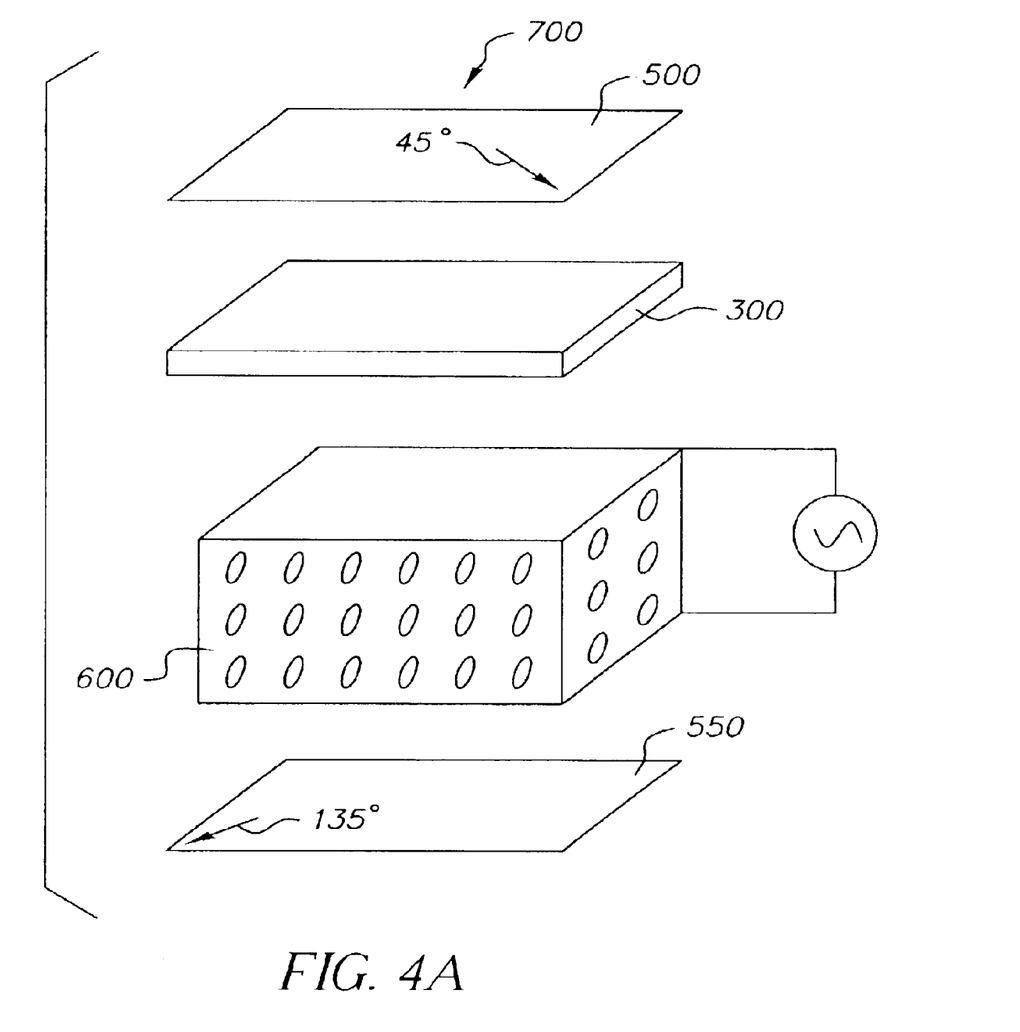
FIG. 4A is an exploded view of a liquid crystal display with one compensating film as an embodiment of the invention

FIG. 4A shows a schematic liquid crystal display 700 where 300 is a single compensating film is placed on one side of the liquid crystal cell 600. 500 is a polarizer, and 550 is a second polarizer. The transmission axes for the polarizers 500 and 550 form a 90°±10° angle relative to each other. The angles of their transmission axes are denoted as 45° and 135° relative to the liquid crystal cell 600. However, other angles are possible depending on the kind of liquid crystal display 700 and this is obvious to those who skilled in the art. Note that 600 is the electrically switchable liquid crystal cell with the liquid crystals confined between two glass plates.

Figure 4B:
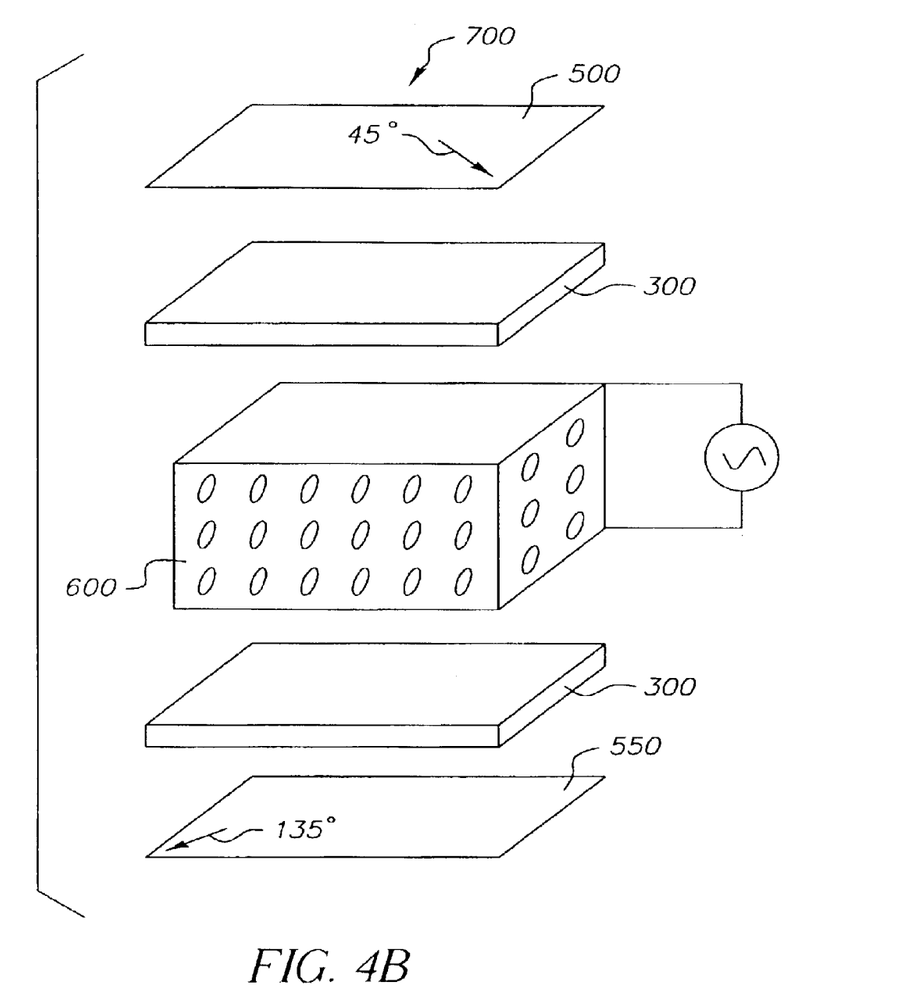
FIG. 4B is an exploded view of a liquid crystal display with two compensating films as an embodiment of the invention

FIG. 4B shows another schematic liquid crystal display 700 where there are two compensating films 300 placed on both sides of the liquid crystal cell (600). 500 is a polarizer and 550 is a second polarizer. The transmission axes for the polarizers 500 and 550 form a 90°±10° angle relative to each other. The angles of their transmission axes are denoted as 45° and 135° relative to the liquid crystal cell 600. However, other angles are possible depending on the kind of liquid crystal display 700 and this is obvious to those who skilled in the art. Note that 600 is the electrically switchable liquid crystal cell with the liquid crystals confined between two glass plates.

Among the liquid crystal cell arrangements useful with the invention are Vertically Aligned (VA) and In-Plane Switching (IPS) cells. In the Vertically Aligned arrangement, the liquid crystal display is one in which electric field is applied in a direction perpendicular to or vertical with respect to the cell plane and the direction of the liquid crystal optic axis is substantially perpendicular to or vertical with respect to the liquid crystal cell plane without an applied field. Therefore, the incoming light essentially does not see the birefringence through the liquid crystal cell. This state is termed the "dark state". In the In-Plane Switching arrangement, the electric field is applied in the direction of the liquid crystal plane and the direction of the liquid crystal optic axis is changed upon application of the electric field while remaining substantially within the plane of the cell.

Compared to the prior art, embodiments of the present invention avoid the need to stretch the film, do not require the use of expensive liquid crystal molecules, don't require film lamination (thus reducing the chance introduction of dirt or unwanted optical retardation from the laminating adhesive), provide enhanced optical compensation in a relatively thin (<140 um) structure, and are easily manufactured. As a further attribute, embodiments enable the control of Re which is primarily the responsibility of the first layer while control of Rth is primarily the responsibility of the second layer. In the prior art, Re and Rth are often coupled and are not controlled independently.

The present invention is further illustrated by the following non-limiting examples of its practice.

EXAMPLES

The aromatic polyesters used herein can be prepared using any suitable or conventional procedure. The procedure used herein followed that outlined by P. W. Morgan in Condensation Polymers: By Interfacial and Solution Methods, Interscience, New York City, N.Y. (1965).

Example 1

Polymer I (Synthesis):

To a stirred mixture of 4,4'-hexafluoroisopropylidenediphenol (33.62 g, 0.1 mole) and triethylamine (22.3 g, 0.22 mole) in methylene chloride (200 mL) at 10° C. was added a solution of terephthaloyl chloride (10.15 g, 0.05 mole) and isophthaloyl chloride (10.15 g, 0.05 mole) in methylene chloride (100 mL). After the addition, the temperature was allowed to rise to room temperature and the solution was stirred under nitrogen for 4 hours, during which time triethylamine hydrochloride precipitated in a gelatinous form and the solution became viscous. The solution was then filtered and washed with dilute hydrochloric acid, (100 mL of 2% acid) followed three times by water (200 mL). The solution was then poured into methanol with vigorous stirring, and a white fibrous polymer precipitated. The glass transition temperature of this polymer was measured by differential scanning calorimetry to be 199° C.

Poly(4,4'-hexafluoroisopropylidene-bisphenol) terephthalate-co-isophthalate

Polymer I

A solution of the polyester (polymer I, 10% solids, 45% methylethylketone, 45% toluene) was coated onto a TAC web. This included the steps of unrolling the TAC web, coating the polymer solution (using a slot hopper), and applying sufficient drying (85° C.) to remove the majority of the solvents. These steps occurred in a roll to roll, continuous process. Spin coating and other coating methods could also be used. Optically clear films of the TAC/polyester structure were produced with the following optical properties. Re, Rth and the second layer thickness were measured with an ellipsometer (model M2000V, J. A. Woollam Co.) at 550 nm wavelength.

TABLE I

| First Layer | Second Layer: Polymer I Layer thickness (μm) | Combined Re, In-Plane Retardation (nm) | Combined Rth, Out-of-Plane Retardation (nm) |
|---|---|---|---|
| 80 μm TAC | 0 | 3 | −58 |
| 80 μm TAC | 2.8 | 3 | −84 |
| 80 μm TAC | 5.6 | 3 | −104 |

Example 2

Polymer II was similarly prepared using terephthaloyl chloride and 4,4'-(hexahydro-4,7-methanoindan-5-ylidene) bisphenol. The glass transition temperature of this polymer was measured by differential scanning calorimetry to be 289° C.

Poly(4,4'-hexahydro-4,7-methanoindan-5-ylidene bisphenol)terephthalate.

Polymer II

When polymer II is spun cast onto a transparent substrate (10% solids in dichloroethane), and then is removed from this substrate it shows the following optical retardations. Re, Rth and the polymer II layer thickness are measured with an ellipsometer (model M2000V, J. A. Woollam Co.) at 550 nm wavelength.

TABLE II

| Polymer II Layer thickness (μm) | Re, In-Plane Retardation (nm) | Rth, Out-of-Plane Retardation (nm) |
|---|---|---|
| 3.4 | 0.2 | −74 |

Example 3

Polymer III was similarly prepared using terephtaloyl chloride, isophthaloyl chloride and 4,4'-isopropylidene-2,2',6,6'-tetrachlorobisphenol. The glass transition temperature of this polymer was measured by differential scanning calorimetry to be 250° C.

Poly(4,4'-isopropylidene-2,2'6,6'-tetrachlorobisphenol)terephthalate-co-isophthalate

Polymer III

When polymer III is spun cast onto glass (10% solids in dichloroethane), and is then removed from this substrate it shows the following optical retardations. Re, Rth and the polymer III layer thickness are measured with an ellipsometer (model M2000V, J. A. Woollam Co.) at 550 nm wavelength.

TABLE III

| Polymer III Layer thickness (μm) | Re, In Plane Retardation (nm) | Rth, Out of Plane Retardation (nm) |
|---|---|---|
| 2.8 | 0.8 | −66 |

Example 4

Polymer IV (Synthesis):

To a stirred mixture of 4,4'-hexafluoroisopropylidenediphenol (23.53 g, 0.07 mole), 4,4'-(2-norbornylidene) bisphenol (8.4 g, 0.03 mole) and triethylamine (22.3 g, 0.22 mole) in methyl ethyl ketone (100 mL) at 10° C. was added a solution of terephthaloyl chloride (19.29 g, 0.095 mole) and isophthaloyl chloride (1.02 g, 0.005 mole) in methyl ethyl ketone (60 mL). After the addition, the temperature was allowed to rise to room temperature and the solution was stirred under nitrogen for 4 hours, during which time triethylamine hydrochloride precipitated in a gelatinous form and the solution became viscous. The solution was then diluted with toluene (160 mL) and washed with dilute hydrochloric acid, (200 mL of 2% acid) followed three times by water (200 mL). The solution was then poured into ethanol with vigorous stirring, and a white bead like polymer precipitated, collected and dried at 50° C. under vacuum for 24 hours. The glass transition temperature of this polymer was measured by differential scanning calorimetry to be 270° C.

Poly(4,4'-hexafluoroisopropylidene-bisphenol-co-4,4'-(2-norbornylidene) bisphenol)terephthalate-co-isophthalate.

Polymer IV

When polymer IV is spun cast onto glass (10% solids in 50% propylacetate 50% toluene), and is then removed from this substrate it shows the following optical retardations. Re, Rth and the polymer III layer thickness are measured with an ellipsometer (model M2000V, J. A. Woollam Co.) at 550 nm wavelength.

TABLE IV

| Polymer IV Layer thickness (μm) | Re, In Plane Retardation (nm) | Rth, Out of Plane Retardation (nm) |
|---|---|---|
| 5.9 | 0.2 | −221 |

Other specific polymers that could be used include:

Poly(4,4'-hexafluoroisopropylidene)-bisphenol-co-(2-norbornylidene)-bisphenol terephthalate. (60/40).

Polymer V

Poly(4,4'-hexahydro-4,7-methanoindan-5-ylidene)-bisphenol-co-(4,4'-isopropylidene-2,2',6,6'-tetrabromo)-bisphenol terephthalate. (50/50)

Polymer VI

Poly(4,4'-isopropylidene-bisphenol-co-4,4'-(2-norbornylidene) bisphenol) terephthalate-co-isophthalate Polymer VII A series of polymers were analyzed for their glass transition temperatures and out of plane birefringence values. It was found that the more desirable polymers for this invention had glass transition temperatures above 180° C. Those with lower glass transition temperatures were found to generally have birefringence values less negative than −0.005.

The invention has been described in detail with particular reference to certain preferred embodiments thereof, but it will be understood that variations and modifications can be effected within the scope of the invention. The entire contents of the patents and other publications referred to in this specification are incorporated herein by reference.

PARTS LIST 5 compensator according to the present invention
6 compensator according to the present invention
7 compensator according to the present invention
10 first polymeric layer having low birefringence
20 second polymeric layer having high birefringence
30 third polymeric layer having low birefringence
40 third polymeric layer having high birefringence
300 compensator according to the present invention
500 polarizer
550 polarizer
600 liquid crystal cell
700 liquid crystal display

What is claimed is:

1. A multilayer compensator for an LC cell comprising one or more first layers having an out-of-plane birefringence not more negative than −0.005 and one or more second layers having an out-of-plane birefringence more negative than −0.005, wherein the layers are amorphous and comprise selected polymeric materials having sufficient thickness so that the overall in-plane retardation (Re) of the compensator is from +20 to −20 nm and the out-of-plane retardation (Rth) of at least one of the one or more second layers is more negative than −20 nm, provided that the polymers contained in the one or more second layers do not have chromophores off of the backbone.

2. The compensator of claim 1 wherein each of the one or more first layers has an out-of-plane birefringence of from 0 to −0.005.

3. The compensator of claim 1 wherein each of the one or more second layers has an out-of-plane birefringence more negative than −0.005.

4. The compensator of claim 1 wherein at least two of the layers are contiguous.

5. The compensator of claim 1 wherein all of the first and second layers are contiguous.

6. The compensator of claim 1 wherein the combined second layers have a thickness of less than 30 micrometers.

7. The compensator of claim 1 wherein the combined second layers have a thickness of from 0.1 to 20 micrometers.

8. The compensator of claim 1 wherein the combined second layers have a thickness of from 1.0 to 10 micrometers.

9. The compensator of claim 1 wherein the combined second layers have a thickness of from 2 to 8 micrometers.

10. The compensator of claim 1 wherein the thickness of the combined first and second layers of the compensator is less than 140 micrometers.

11. The compensator of claim 1 wherein the thickness of the combined first and second layers of the compensator is from 40 to 115 micrometers.

12. The compensator of claim 1 wherein the thickness of the combined first and second layers of the compensator is from 70 to 100 micrometers.

13. The compensator of claim 1 wherein the Rth of at least one second layer is −60 nm or more negative.

14. The compensator of claim 1 wherein the Rth of at least one second layer is from −60 to −600 nm.

15. The compensator of claim 1 wherein the Rth of at least one second layer is from −150 to −500 nm.

16. The compensator of claim 1 wherein the second layer comprises a polymer containing in the backbone a non-visible chromophore group and has a Tg above 180° C.

17. The compensator of claim 2 wherein the second layers comprise a polymer having a Tg above 180° C.

18. The compensator of claim 16 wherein the second layer comprises a polymer containing in the backbone a vinyl, carbonyl, amide, imide, ester, carbonate, aromatic, sulfone, or azo group.

19. The compensator of claim 16 wherein the non-visible chromophore group includes a carbonyl, amide, imide, ester, carbonate, phenyl, naphthyl, biphenyl, bisphenol, or thiophene group.

20. The compensator of claim 16 wherein the non-visible chromophore group includes a heterocyclic or carbocyclic aromatic group.

21. The compensator of claim 1 wherein the second layer comprises 1) poly(4,4'-hexafluoroisopropylidene-bisphenol) terephthalate-co-isophthalate, 2) poly(4,4'-hexahydro-4,7-methanoindan-5-ylidene bisphenol)terephthalate, 3) poly(4,4'-isopropylidene-2,2',6,6'-tetrachlorobisphenol) terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, or 6) poly(4,4'-isopropylidene-bisphenol-co-4,4'-(2-norbornylidene)bisphenol)terephthalate-co-isophthalate or copolymers of any of the foregoing.

22. The compensator of claim 1 wherein the second layer comprises poly(4,4'-hexafluoroisopropylidene-bisphenol-co-4,4'-(2-norbornylidene)bisphenol)terephthalate-co-isophthalate or copolymers thereof.

23. The compensator of claim 1 wherein the first layer comprises a polymer other than a polymer containing in the backbone a non-visible chromophore group any having a Tg above 180° C.

24. The compensator of claim 1 wherein the first polymer comprises triacetylcellulose (TAC), polycarbonate, cyclic polyolefin or polyarylate containing fluorene groups.

25. The compensator of claim 1 wherein the first polymer is triacetylcellulose (TAC).

26. A multilayer compensator for an LC cell comprising one or more first layers and one or more second, wherein the layers are amorphous and comprise selected polymeric materials, in which each second layer comprises a polymer containing in the backbone a non-visible chromophore group and has a Tg above 180° C. and in which each first layer does not comprise such a polymer, the layers having sufficient thickness so that the overall in-plane retardation (Re) of the compensator is from +20 to −20 nm and the out-of-plane retardation (Rth) of at least one of the one or more second layers is more negative than −20 nm.

27. A liquid crystal (LC) display comprising a liquid crystal cell, a pair of crossed polarizers one located one on each side of the cell, and at least one compensator of claim 1.

28. A liquid crystal (LC) display comprising a liquid crystal cell, a pair of crossed polarizers, one located on each side of the cell, and at least one compensator of claim 4.

29. A liquid crystal (LC) display comprising a liquid crystal cell, a pair of crossed polarizers, one located on each side of the cell, and at least one compensator of claim 16.

30. The display of claim 28 wherein the liquid crystal cell is a Vertically Aligned or twisted nematic cell.

31. The display of claim 27 wherein the liquid crystal cell is arranged in In-Plane Switching mode.

32. A multilayer compensator for an LC cell comprising one or more first layers having an out-of-plane birefringence not more negative than −0.005 and one or more second layers having an out-of-plane birefringence more negative than −0.005, wherein the layers are amorphous and comprise selected polymeric materials having sufficient thickness so that the overall in-plane retardation (Re) of the compensator is from +20 to −20 nm and the out-of-plane retardation (Rth) of at least one of the one or more second layers is more negative than −20 nm wherein the polymer materials in the second layers comprise 1) poly(4,4'-hexafluoroisopropylidene-bisphenol)terephthalate-co-isophthalate, 2) poly(4,4'-hexahydro-4,7-methanoindan-5-ylidene bisphenol)terephthalate, 3) poly(4,4'-isopropylidene-2,2',6,6'-tetrachlorobisphenol)terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, or 6) poly(4,4'-isopropylidene-bisphenol-co-4,4'-(2-norbornylidene)bisphenol)terephthalate-co-isophthalate or copolymers of any of the foregoing.

33. The compensator of claim 32 wherein the polymer materials in the second layers comprise) poly(4,4'-isopropylidene-bisphenol-co-4,4'-(2-norbornylidene)bisphenol)terephthalate-co-isophthalate.

34. A multilayer compensator for an LC cell comprising one or more first layers having an out-of-plane birefringence not more negative than −0.005 and one or more second layers having an out-of-plane birefringence more negative than −0.005, wherein the layers are amorphous and comprise selected polymeric materials having sufficient thickness so that the overall in-plane retardation (Re) of the compensator is from 20 to −20 nm and the out-of-plane retardation (Rth) of at least one of the one or more second layers is more negative than −20 nm
wherein the second layer comprises a polymer containing in the backbone a non-visible chromophore group and has a Tg above 180° C. and contains in the backbone a vinyl, carbonyl, amide, ester, carbonate, aromatic, sulfone, or azo group.

35. The compensator of claim 34 wherein each of the one or more first layers has an out-of-plane birefringence of from 0 to −0.005.

36. The compensator of claim 34 wherein each of the one or more second layers has an out-of-plane birefringence more negative than −0.005.

37. The compensator of claim 34 wherein at least two of the layers are contiguous.

38. The compensator of claim 34 wherein all of the first and second layers are contiguous.

39. The compensator of claim 34 wherein the combined second layers have a thickness of less than 30 micrometers.

40. The compensator of claim 34 wherein the thickness of the combined first and second layers of the compensator is from 40 to 115 micrometers.

41. The compensator of claim 34 wherein the Rth of at least one second layer is −60 nm or more negative.

42. The compensator of claim 34 wherein the second layer comprises 1) poly(4,4'-hexafluoroisopropylidene-bisphenol)terephthalate-co-isophthalate, 2) poly(4,4'-hexahydro-4,7-methanoindan-5-ylidene bisphenol)terephthalate, 3) poly(4,4'-isopropylidene-2,2',6,6'-tetrachlorobisphenol)terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, or 6) poly(4,4'-isopropylidene-bisphenol-co-4,4'-(2-norbornylidene)bisphenol)terephthalate-co-isophthalate or copolymers of any of the foregoing.

43. A multilayer compensator for an LC cell comprising one or more first layers having an out-of-plane birefringence not more negative than −0.005 and one or more second layers having an out-of-plane birefringence more negative than −0.005, wherein the layers are amorphous and comprise selected polymeric materials having sufficient thickness so that the overall in-plane retardation (Re) of the compensator is from +20 to −20 nm and the out-of-plane retardation (Rth) of at least one of the one or more second layers is more negative than −20 nm
wherein the second layers comprise a polymer containing in the backbone a non-visible chromophore group that does not contain a chromophore off of the backbone and has a Tg above 180° C.

44. The compensator of claim 43 wherein each of the one or more first layers has an out-of-plane birefringence of from 0 to −0.005.

45. The compensator of claim 43 wherein each of the one or more second layers has an out-of-plane birefringence more negative than −0.005.

46. The compensator of claim 43 wherein at least two of the layers are contiguous.

47. The compensator of claim 43 wherein all of the first and second layers are contiguous.

48. The compensator of claim 43 wherein the combined second layers have a thickness of less than 30 micrometers.

49. The compensator of claim 43 wherein the thickness of the combined first and second layers of the compensator is from 40 to 115 micrometers.

50. The compensator of claim 43 wherein the Rth of at least one second layer is −60 nm or more negative.

51. The compensator of claim 43 wherein the second layer comprises 1) poly(4,4'-hexafluoroisopropylidene-bisphenol)terephthalate-co-isophthalate, 2) poly(4,4'-hexahydro-4,7-methanoindan-5-ylidene bisphenol)terephthalate, 3) poly(4,4'-isopropylidene-2,2',6,6'-tetrachlorobisphenol)

terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(44'-isopropylidene-2,2',6,6'-tetrabromo)-bisphenol terephthalate, or 6) poly(4,4'-isopropylidene-bisphenol-co-4,4'-(2-norbornylidene)bisphenol)terephthalate-co-isophthalate or copolymers of any of the foregoing.

* * * * *

UNITED STATES PATENT AND TRADEMARK OFFICE
CERTIFICATE OF CORRECTION

PATENT NO. : 6,964,795 B2
APPLICATION NO. : 10/431742
DATED : November 15, 2005
INVENTOR(S) : James F. Elman et al.

It is certified that error appears in the above-identified patent and that said Letters Patent is hereby corrected as shown below:

1. Based on 116 Amendment rewrite Issued Claims 21, 22, 40 and 51 to read as follows:

Column 12, Line 42
21. A multilayer compensator for an LC cell comprising one or more first layers having an out-of-plane birefringence not more negative than -0.005 and one or more second layers having an out-of-plane birefringence more negative than -0.005, wherein the layers are amorphous and comprise selected polymeric materials having sufficient thickness so that the overall in-plane retardation (Re) of the compensator is from +20 to -20nm and the out-of-plane retardation (Rth) of at least one of the one or more second layers is more negative than -20nm, provided that the polymers contained in the one or more second layers do not have chromophores off of the backbone wherein the second layer comprises 1)poly(4,4'-hexafluoroisopropylidene-bisphenol) terephthalate-co-isophthalate, 2)poly(4,4'-hexahydro-4,7-methanoindan-5-ylidene bisphenol) terephthalate, 3) poly(4,4'-isopropylidene-2,2'6,6'-tetrachlorobisphenol) terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, or 6) poly(4,4'-isopropylidene-bisphenol-co- 4,4'-(2-norbornylidene) bisphenol) terephthalate-co-isophthalate or copolymers of any of the foregoing.

Column 12, Line 55
22. The compensator of claim 11 wherein the second layer comprises poly(4,4'-hexafluoroisopropylidene-bisphenol-co- 4,4'-(2-norbornylidene) bisphenol) terephthalate-co-isophthalate or copolymers thereof.

UNITED STATES PATENT AND TRADEMARK OFFICE
CERTIFICATE OF CORRECTION

PATENT NO. : 6,964,795 B2
APPLICATION NO. : 10/431742
DATED : November 15, 2005
INVENTOR(S) : James F. Elman et al.

It is certified that error appears in the above-identified patent and that said Letters Patent is hereby corrected as shown below:

Column 14, Line 19
42. A multilayer compensator for an LC cell comprising one or more first layers having an out-of-plane birefringence not more negative than -0.005 and one or more second layers having an out-of-plane birefringence more negative than -0.005, wherein the layers are amorphous and comprise selected polymeric materials having sufficient thickness so that the overall in-plane retardation (Re) of the compensator is from +20 to -20nm and the out-of-plane retardation (Rth) of at least one of the one or more second layers is more negative than -20nm wherein the second layer comprises a polymer containing in the backbone a non-visible chromophore group and has a Tg above 180°C and contains in the backbone a vinyl, carbonyl, amide, ester, carbonate, aromatic, sulfone, or azo group wherein the second layer comprises 1)poly(4,4'-hexafluoroisopropylidene-bisphenol) terephthalate-co-isophthalate, 2)poly(4,4'-hexahydro-4,7-methanoindan-5-ylidene bisphenol) terephthalate, 3) poly(4,4'-isopropylidene-2,2'6,6'-tetrachlorobisphenol) terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, or 6) poly(4,4'-isopropylidene-bisphenol-co- 4,4'-(2-norbornylidene) bisphenol) terephthalate-co-isophthalate or copolymers of any of the foregoing.

Column 14, Line 63
51. A multilayer compensator for an LC cell comprising one or more first layers having an out-of-plane birefringence not more negative than -0.005 and one or more second layers having an out-of-plane birefringence more negative than -0.005, wherein the layers are amorphous and comprise selected polymeric materials having sufficient thickness so that the overall in-plane retardation (Re) of the compensator is from +20 to -20nm and the out-of-plane retardation (Rth) of at least one of the one or more second layers is more negative than -20nm,
wherein the second layers comprise a polymer containing in the backbone a non-visible chromophore group that does not contain a chromophore off of the backbone and has a Tg above 180°C wherein the second layer comprises l)poly(4,4'-hexafluoroisopropylidene-bisphenol) terephthalate-co-isophthalate, 2)poly(4,4'-hexahydro-4,7-methanoindan-5-ylidene bisphenol) terephthalate, 3) poly(4,4'-isopropylidene-2,2'6,6'-tetrachlorobisphenol) terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, or 6) poly(4,4'-isopropylidene-bisphenol-co- 4,4'-(2-norbornylidene) bisphenol) terephthalate-co-isophthalate or copolymers of any of the foregoing.

UNITED STATES PATENT AND TRADEMARK OFFICE
CERTIFICATE OF CORRECTION

| | |
|---|---|
| PATENT NO. | : 6,964,795 B2 |
| APPLICATION NO. | : 10/431742 |
| DATED | : November 15, 2005 |
| INVENTOR(S) | : James F. Elman et al. |

Page 3 of 4

It is certified that error appears in the above-identified patent and that said Letters Patent is hereby corrected as shown below:

II. Based on Examiner Amendment upon allowance dated 5/17/05, the following claims should read as follows:

Column 11, Line 46
    1. A multilayer copensator for an LC cell comprising one or more first layers having an out-of-place birefringence not more negative than –0.005 and one or more second layers having an out-of-place birefringence more negative than –0.005, wherein the layers are amorphous and comprise selected polymeric materials having sufficient thickness so that the overall in-plane retardation (Re) of the compensator is from +20 to -20nm and the out-of-plane retardation (Rth) of at least one of the one or more second layers is more negative than -20nm, provide that the polymers contained in the one ore more second layers do not have chromophores off of the backbone, wherein the term "amorphous" means that the compensator does not produce any sharp diffraction peaks when exposed to X-ray diffraction analysis.

Column 13, Line 1
    26. A multilayer compensator for an LC cell comprising one or more first layers and one or more second layers, wherein the layers are amorphous and comprise selected polymeric materials, in which each second layer comprises a polymer containing in the backbone a non-visible chromophore group and has Tg abouve 180°C and in which each first layer does not comprise such a polymer containing in the backbone a non-visible chromophore group along with a Tg above 180°C, the layers having sufficient thickness that the overall in-plane retardation (Re) of the compensator is from +20 to -20nm and the out-of-plane retardation (Rth) of at least one of the one or more second layers is more negative than -20nm, wherein the term "amorphous" means compensator does not produce any sharp diffraction peaks when exposed to X-ray diffraction analysis.

UNITED STATES PATENT AND TRADEMARK OFFICE
CERTIFICATE OF CORRECTION

PATENT NO. : 6,964,795 B2
APPLICATION NO. : 10/431742
DATED : November 15, 2005
INVENTOR(S) : James F. Elman et al.

Page 4 of 4

It is certified that error appears in the above-identified patent and that said Letters Patent is hereby corrected as shown below:

Column 13, Line 53
34. A multilayer compensator for an LC cell comprising one or more first layers having an out-of-plane birefringence not more negative than -0.005 and one or more second layers having an out-of-plane birefringence more negative than -0.005, wherein the layers are amorphous and comprise selected polymeric materials having sufficient thickness that the overall in-plane retardation (Re) of the compensator is from +20 to -20nm and the out-of-plane retardation (Rth) of at least one of the one or more second layers is more negative than -20nm, in which each second layer comprises a polymer that contains a non-visible chromophore group in the backbone, including a vinyl, carbonyl, amide, ester, carbonate, aromatic, sulfone, or azo group, and has a Tg above 180°C, wherein the term "amorphous" means that the compensator does not produce any sharp diffraction peaks when exposed to X-ray diffraction analysis.

Column 14, Line 32
43. A multilayer compensator for an LC cell comprising one or more first layers having an out-of-plane birefringence not more negative than -0.005 and one or more second layers having an out-of-plane birefringence more negative than -0.005, wherein the layers are amorphous and comprise selected polymeric materials having sufficient thickness so that the overall in-plane retardation (Re) of the compensator is from +20 to -20nm and the out-of-plane retardation (Rth) of at least one of the one or more second layers is more negative than -20nm,
 wherein the one or more second layers comprise(s) a polymer that contains in the backbone a non-visible chromophore group that does not contain a chromophore off of the backbone and has a Tg above 180°C, wherein the term "amorphous" means that the compensator does not produce any sharp diffraction peaks when exposed to x-ray diffraction analysis.

Signed and Sealed this

Twenty-sixth Day of December, 2006

JON W. DUDAS
*Director of the United States Patent and Trademark Office*